Figure 1:
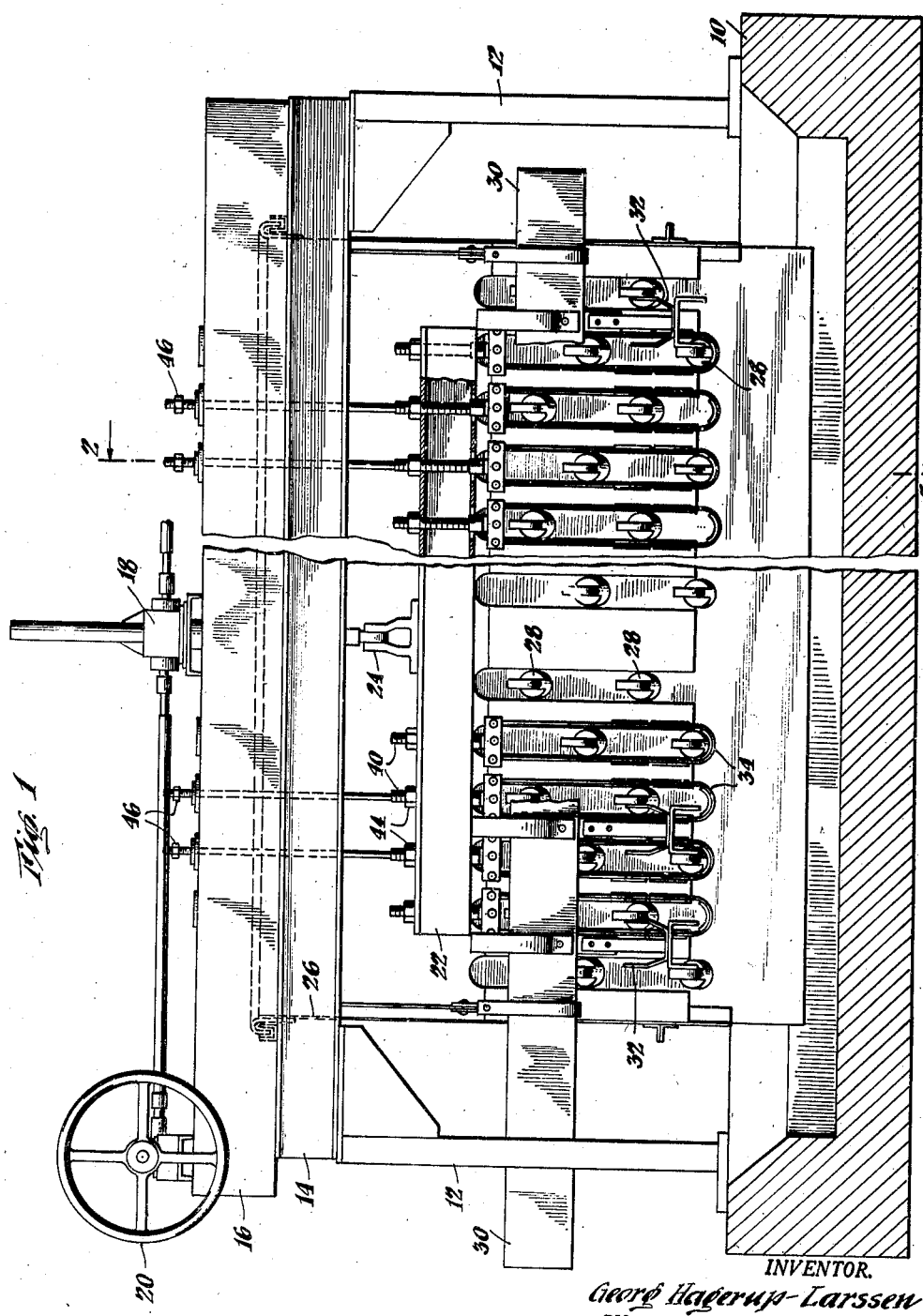

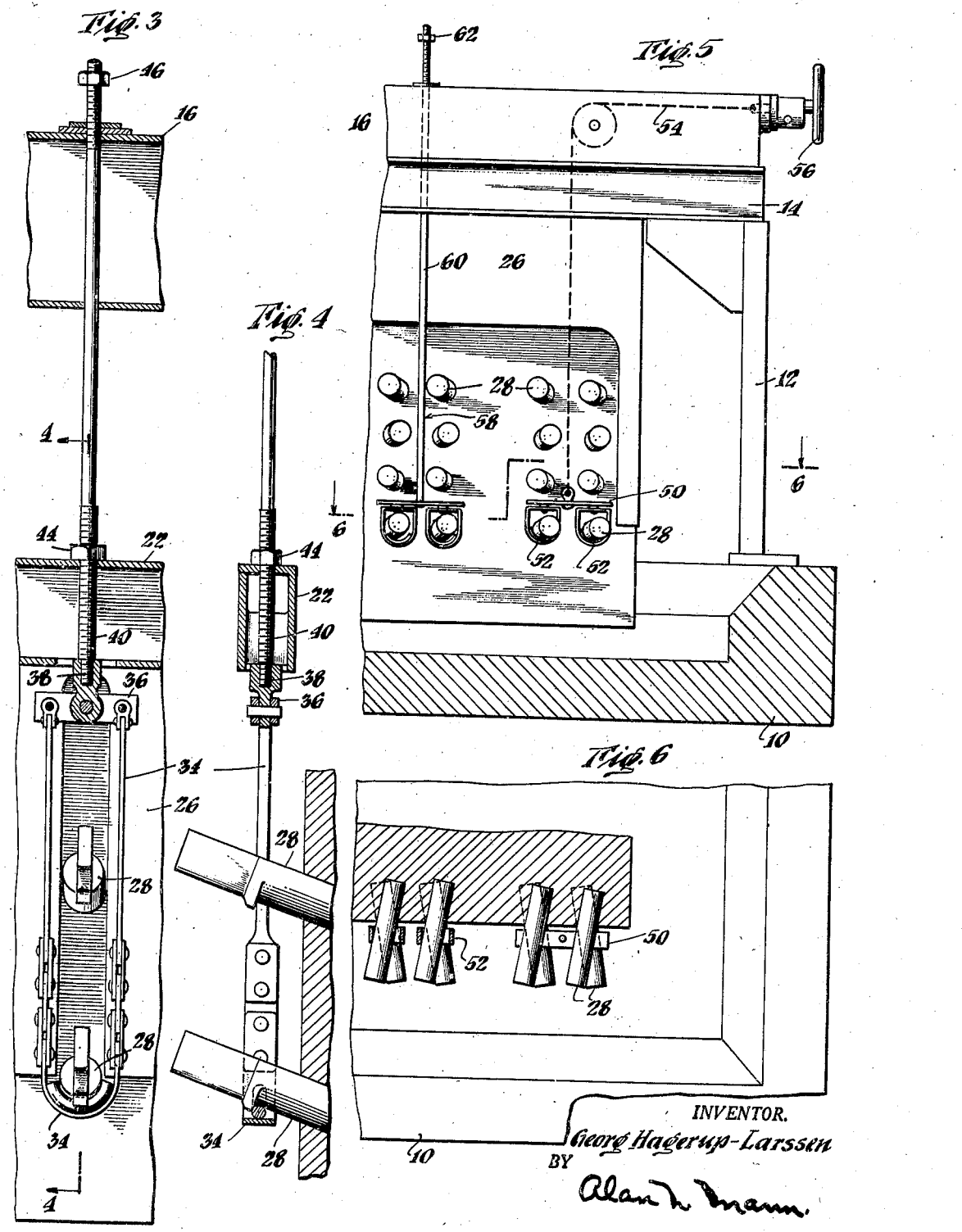

Patented Jan. 11, 1944

2,339,230

UNITED STATES PATENT OFFICE 2,339,230

SUSPENSION OF SELF-BAKING ELECTRODES

Georg Hagerup-Larssen, New York, N. Y., assignor to Det Norske Aktieselskab for Elektrokemisk Industri, Oslo, Norway, a corporation of Norway Application April 17, 1943, Serial No. 483,475

8 Claims. (Cl. 13—14)

The use of self-baking electrodes is now standard in many plants where electrolytic processes are carried on, particularly in the production of aluminum. Such electrodes ordinarily are made of rectangular shape and are quite large. The lower part of the electrode is baked and hardened by the heat of the furnace and has substantial strength, but the upper part of the electrode is in the form of a paste which has sufficient fluidity so as to exert a substantial hydraulic pressure tending to push out the sides of the electrode casing. To keep the electrode casing from bulging under this pressure, it has been customary to provide steel beams placed along the sides of the electrode and so to arrange them that as the electrode moves downward, the bottom beams could be periodically removed and again applied at the top.

In order to make the electrical contacts, contact pins are driven into the sides of the electrodes high enough up so that electrode material is still soft, and as the electrode moves downward and the electrode hardens, these pins become firmly imbedded. The contact pins heretofore have been driven through appropriate holes made in the side support beams, or these beams are arranged directly below the row of contact pins. Heretofore these support beams acting through a whole row of contact pins have served also as a suspension means for the electrode. Such an arrangement is shown for example in Torchet Patent No. 2,073,356.

As the use of these self-baking electrodes has increased, the tendency of the art has been to increase the size of the electrodes, and now they may be as large as 4 feet by 15 feet, or even larger. When the electrode has a length (maximum horizontal dimension) in this order, the beams necessary to act both to keep the electrode in shape and to suspend it, become heavy and cumbersome and demand the use of substantial amounts of steel. Other patents have disclosed mechanism for retaining the electrode in shape but when these support beams are eliminated, the manner of suspending the electrode so that it can be fed downward without interruption has offered substantial difficulties.

I have solved this problem by utilizing the fact that the strength of the electrode and its grip on the contact pins near the bottom is such that the electrode can be suspended from not more than half of the contact pins in a given horizontal row, and in many instances from as few as four such pins at one time. Utilizing this fact, I provide a suspension mechanism which comprises a support structure for the electrode, such as a steel framework surrounding the electrode well above the point of consumption, which cooperates with a plurality of groups of suspension members which suspend the electrode from the support structure by attachment direct to the contact pins.

Each such group of suspension members comprises suspension members of two types. One set or type is made up of movable suspension members which are connected with appropriate mechanism so that they can be lowered from time to time to feed the electrode toward the point of consumption. The other set of suspension members, at least one of which is included in each group referred to, is adapted to be connected to a contact pin near the bottom of the electrode and suspend the electrode direct from the support structure so that the electrode can be held substantially immovable when the contact pins to which the movable suspension members are connected are in approximately their bottom position. Thus when the movable members have been lowered about as far as is feasible, the suspension members which serve as fixed supports hold the electrode against further movement. This connection should be made manually at this time; it is possible, but not practical in ordinary operation to have this connection result from the fixed suspension members serving as a limit so that when the electrode reaches a given position, the weight of the electrode is automatically taken up by these fixed suspension members. In any event, when the fixed suspension members are supporting their contact pins, the movable suspension members can be disconnected and then raised and connected to an upper set of contact pins. The fixed connections are then released and disconnected from the contact pins to which they were connected and the suspension is again made through the movable members, so that the electrode can be fed downward as desired.

Various specific arrangements of the two types of suspension members in each group can be had, but I prefer an arrangement whereby the suspension members which serve as the fixed supports can also serve to support the electrode during its movement. I accomplish this by supplying a movable beam along each side of the electrode. The movable suspension members are connected to these beams and the beams in turn are connected with appropriate operating jacks. The suspension members which serve as fixed supports pass through these movable beams and also through fixed beams higher up in the structure, and are provided with appropriate stop devices, such as nuts threaded on rods, above each of these beams.

During the period that the electrode is being fed downwardly the nuts bearing against the movable beam will control the position of this suspension mechanism and therefore it will help to carry the weight of the electrode while the electrode is being fed downwardly. The nut at the top of the rod of such a suspension member above the fixed support should be so adjusted as not to interefere with the movement of the electrode, but when the contact pins of the row carrying the load reach approximately their bottommost position and the operator considers it is time to withdraw them, the top nuts are screwed down so that they will bear against the fixed support and prevent further downward movement of the electrode. The suspension members which serve only as movable suspension members are then disconnected from their contact pins and the nuts on the fixed suspension members which bore against the movable beam are screwed back so that these beams can be raised up until the movable suspension members are in line with, and can be connected to an upper row of contact pins. The nuts at the top of the fixed supports can then be slacked off, releasing the fixed suspension members which can be disconnected from their contact pins and then drawn upwardly by tightening up the nuts bearing against the movable beam until they also can be connected to contact pins in an upper row and again become part of the movable suspension mechanism.

This type of arrangement is usually employed with the contact pins in successive rows being placed in staggered relationship, which means that ordinarily a set of movable suspension members and fixed suspension members will be supplied for the different vertical rows of contact pins.

As an alternative construction, two sets of beams may be used, both of which are movable, and each set being capable of being moved independent of the other. In such case one of these beams would serve as a movable support cooperating with one row of contact pins and the other would serve as the fixed support (cooperating with the next upper row of contact pins) to hold the electrode immovable while the first set was being changed over. The function of the two beams could then be reversed and the beam which had been serving as the fixed support would become the movable support until the time arrived for another change.

According to another arrangement, the suspension is simplified by having the contact studs inserted into the electrode in pairs, thus employing one common suspension arrangement for two adjacent contact studs. In such case, a single suspension member may run to a yoke forming a cradle supporting the external end of two contact studs.

By this arrangement the weight is automatically distributed between the two fixed contact studs giving a very economical design. One movable suspension can run to two of the studs and a fixed suspension can run to another adjacent pair of studs. If this design is used with studs in staggered arrangement, the attachment to the short beam must be made off-center so as not to interfere with the intermediate row of contact studs. If the studs are placed in vertical rows and not staggered, there is a tendency for the electrode to be weakened by the formation of vertical cleavages and the electrical current may not be evenly distributed. These difficulties can be overcome by driving in the contact studs in pairs at different angles to a vertical plane perpendicular to the side of the electrode into which the pins are driven. For example, the studs in one row may lie in a plane at the usual angle to the horizontal but at a deviation of 20° to the left of a vertical plane perpendicular to the face of the electrode. The studs in the next row above and the next row below may be positioned in a similar manner but with a deviation of 20° to the right of such perpendicular plane.

Figure 2:
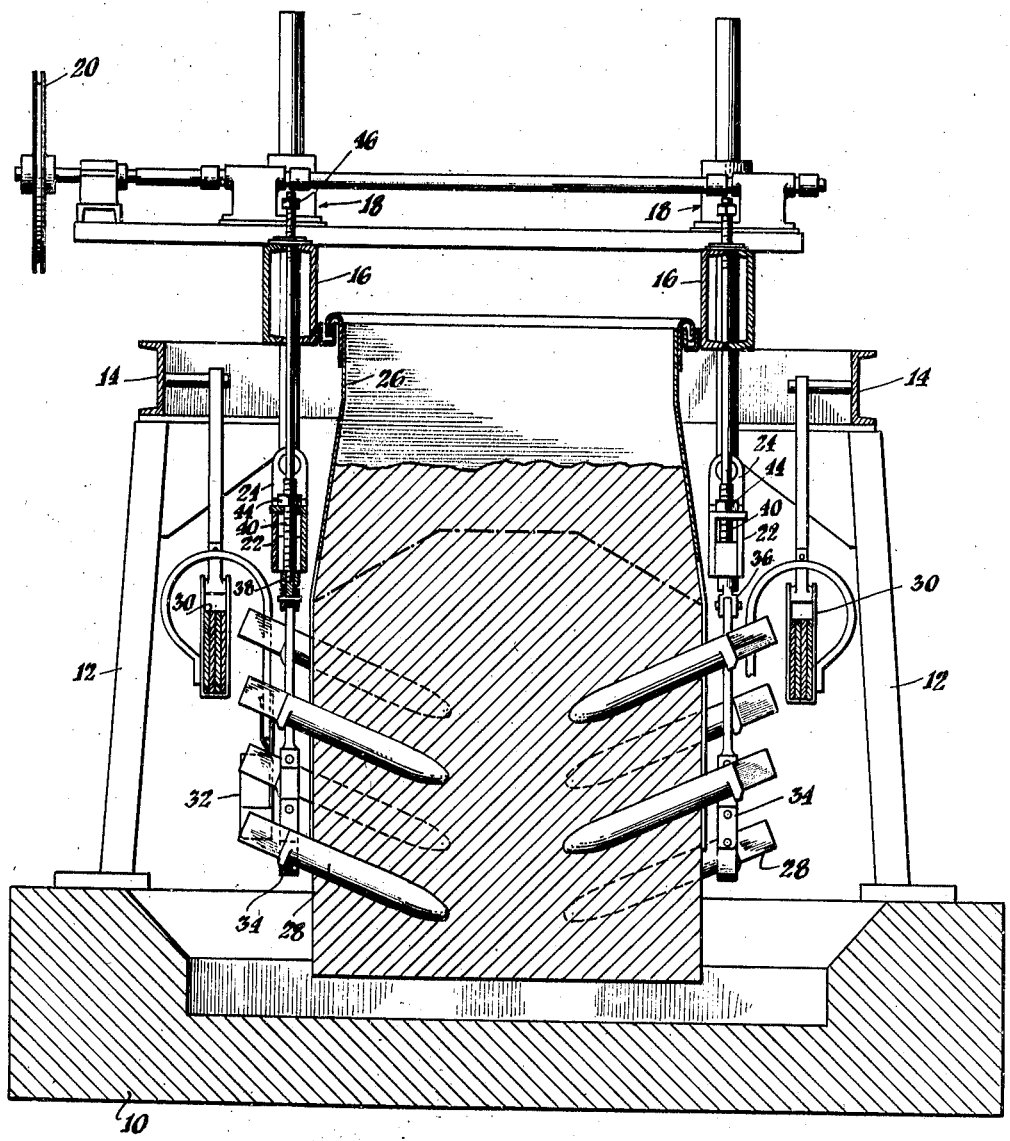

This invention may be readily understood by reference to the accompanying drawings in which Fig. 1 is a side view of a furnace embodying my invention but broken through the middle to shorten the same; Fig. 2 is a section on line 2—2 of Fig. 1; Fig. 3 is an enlarged detail of one of the suspension members with the suspension beam shown in section; Fig. 4 is a view of the part shown in Fig. 3 but taken at right angles; Fig. 5 is a detailed view of a modification, and Fig. 6 is a section on line 6—6 of Fig. 5.

In these drawings, the furnace 10 has mounted thereon a superstructure comprising upright columns 12, a top framework 14 and fixed suspension beams 16. Toward each end of each beam 16 is positioned a jack 18, and all four of these jacks are operated simultaneously by a common wheel 20. It is to be noted that only two of the jacks are shown in the drawings as the other two will be near the other end of the furnace, within the portion that is broken away and not shown in the drawings.

Suspended below the beams 16 are the movable beams 22 connected to the jacks 18 as indicated at 24. The beams 22 can be raised or lowered simultaneously by the operation of the hand wheel 20.

The electrode is formed by introducing proper paste into the casing 26. In accordance with the regular practice with such electrodes, this paste is hardened by the heat of the furnace so that it becomes a solid electrode at the bottom. Contact studs 28 are driven into the electrode mass through appropriate slots in the casing 26. In the example shown in Figs. 1 and 2 there are four rows of these contact studs with the studs in alternate rows arranged in staggered relationship. The electrical connections to the contact studs 28 are made through the bus bars 30 and the contact members 32 each of which is here shown as carrying four contact terminals for attachment to contact studs as described in more detail in my copending application Ser. No. 436,585.

The weight of the electrode (which may be as much as 20 tons) is, during normal operation, suspended from the movable beams 22 by alternate suspension straps 34. It is highly desirable to have the weight of the electrodes carried by the contact studs near the bottom where the electrode mass has the greatest strength. Accordingly these contact straps alternately sustain the electrode from those contact studs which form the lowest row.

As illustrated in Figs. 3 and 4, the contact straps 34 are connected through a yoke 36 with a rod 38. The rod 38 has an enlarged threaded portion 40 running through the movable beam 22, and this threaded portion 40 is here shown as provided with a stop mechanism in the form of a nut 44 which in normal operation bears against the top surface of movable beam 22.

Certain of the suspension straps 34 end with the enlarged portion 40 but others (and at least one near each corner of the electrode) continues up through the fixed beam 16 and at its upper end is provided with a nut 46.

In Fig. 1 of the drawings, the device is shown in a normal position with the beam 22 lowered part way down. It will be noted that in this case the weight of the electrode is carried by the contact studs in the second and fourth vertical rows counting from the right hand end, and by the studs in the third and fifth vertical rows counting from the left hand end. Of these, the suspension mechanism supporting the stud in the second row from the right and the suspension mechanism supporting the stud in the fifth row from the left each terminates at the movable beam 22, whereas the suspension mechanism for the studs in the fourth row from the right and in the third row from the left run up through the fixed beam 16.

When the time comes to withdraw a bottom row of contact pins, the nuts 46 above the beam 16 are screwed down so that they will bear against the upper surface of this fixed beam. A slight further downward movement of the movable beam 22 will then release all strain from that beam. The contact straps which are suspended only from this beam can then be swung outwardly and disconnected from their contact pins and since the nuts 44 on those suspension rods which run up through the fixed beam are no longer carrying any load, these nuts are screwed up so that the movable beams 22 can be raised through the operation of the hand wheel 20. When this is done, the suspension straps 34 in line with the third and fifth row of studs counting from the right hand end and in line with the second and fourth row of contact studs counting from the left hand end will be drawn up against contact studs in the second horizontal row from the bottom to carry the weight of the electrode. The nuts 46 which previously had carried the load are then slacked off and the corresponding suspension straps are loosened up and disconnected. These rods are then lifted and the nuts 44 which has been unscrewed are again screwed back in place. The weight is then all carried by the second row of studs from the bottom and the bottom row of studs can be withdrawn and again inserted in the appropriate positions to form a new top row. The electrical connections usually are moved to an upper row of studs about one day before the suspension straps are moved. This helps to insure adequate strength.

By the arrangement shown the weight of the electrode is carried by a relatively large number of studs during normal operation and is carried by a smaller number of studs during the change when the weight is being transferred from one horizontal row to the next. However, at all times the weight of the electrode is adequately taken care of without risk of improper movement taking place. At the same time there are no heavy beams which need to be removed by hand from a bottom position and lifted up to a higher position, for the only beams that move are those which are operated by the hand wheel 20 which functions through the jacks 18.

It is obvious that as an alternative method of operation when the change-over is being made, instead of carrying the load on the contact pin in the fourth row from the right and in the third row from the left, the support mechanism co- operating with the contact pin in the third row from the right and the fourth row from the left may be drawn up to suspend the electrode from the fixed support beams 16. This is a somewhat less desirable method of operation as the electrode is then being carried by a limited number of contact pins in an upper row where the strength of the electrode may not have fully developed.

In Figs. 5 and 6 the studs 28 are driven into the electrode mass at the same angle relative to the horizontal as before but instead of being driven in parallel to a vertical plane perpendicular to the face of the electrode, alternate rows of these studs are driven in at an angle to such vertical plane with the angles in alternate rows being reversed. This is clearly illustrated in Fig. 6.

In this case, a movable suspension member comprises the yoke 50 having two loops 52 each one of which embraces a contact stud 28. The yoke 50 is connected to a flexible cable 54, so that it can be raised or lowered through the operation of a wheel 56. In connection with the movable suspension yoke 50 is another similar yoke 58 connected to a rod 60 running up through the fixed beam 16. This rod is equipped with a nut or similar stop mechanism 62.

With this construction the electrode is lowered with the weight carried by the movable yoke 50 and the cable 54 until it reaches approximately its bottom-most position when the nut 62 is screwed down to engage the top of the beam 16. The cable 54 is then slacked off slightly and the yoke 50 removed from the lower studs 28 and engaged around the two studs immediately above and the cable 54 is tightened until it is carrying the load. The nut 62 is then slackened and screwed up far enough not to interfere with operations and the yoke 58 is moved up to the next pair of studs. As before, the bottom studs are withdrawn from the electrode as soon as the suspension mechanism is removed from them and they are then driven in at the top where the electrode material is comparatively soft.

By either of these arrangements the weight is applied to a row of studs only when it is near the point where the electrode is consumed and when the electrode is thoroughly baked and hardened. As has already been stated, this may be insured if a day or two before the suspension members are changed and two to three weeks after the studs have initially been driven into the electrodes, the electrical connections are changed to an upper row of contacts so that the flow of electrical current will give a final baking effect.

It has been found that when the electrodes are thoroughly baked, it may take a force of as much as from 10 to 20 tons to pull out a contact stud where the contact stud has a diameter of about 70 mm. and is inserted for a distance of approximately 300 mm. into the electrode. From this, plus the fact that it has been found that the electrode has sufficient mechanical strength, it will be seen that four contact studs can carry the weight of the electrode during the change-over even with very large electrodes that may have a capacity of 45,000 amperes or more. Obviously there should be at least four supports at any one time to give stability, so that, as a practical matter, the total number of suspension members must be at least eight.

What I claim is:

1. A suspension mechanism for self-baking electrodes of the type described, comprising a plurality of contact studs driven into the sides of such an electrode, fixed support members, movable support members, and a plurality of suspension members, a part of which are adapted to connect contact studs to the fixed support members and a part of which are adapted to connect contact studs to the movable support members, whereby the weight of the electrode may alternately be carried by the fixed support members and by the movable support members.

2. A structure as specified in claim 1 in which contact studs are connected to the movable support members during normal operation and movement of the electrode, and in which studs are connected to the fixed support members while the suspension members connected to the movable support member are disconnected from the studs.

3. A structure as specified in claim 1, which includes a common movable support member for two adjacent contact studs, such support member comprising a beam suspended at an intermediate point.

4. A structure as specified in claim 1 in which the suspension members that connect contact pins with the fixed support members are also adapted to connect contact studs to the movable support members while the electrode is being fed downwardly and are adapted to be disconnected from the movable support members when a movable support member is being moved upwardly.

5. A structure as specified in claim 1 in which the suspension members comprise flexible loops adapted to be hooked under the contact studs and in which the support members comprise beams running along the sides of the electrode.

6. A structure as specified in claim 1 in which the contact studs are driven into the electrode in horizontal rows with the studs in successive rows approximately above each other but at reversed angles relative to a vertical plane at right angles to the face of the electrode into which the studs are driven.

7. A suspension mechanism for self-baking electrodes of the type described, comprising a plurality of contact studs driven into the sides of such an electrode and arranged in horizontal rows, a fixed support structure for the electrode and a plurality of groups of suspension members adapted to suspend such electrode from such support structure by attachment to such contact studs, each group comprising at least two suspension members, one of such suspension members being a movable member adapted to be lowered from time to time to feed the electrode toward the point of consumption and another of such members in each group being adapted by direct connection between the fixed support structure and a contact stud to assist in holding said electrode against substantial movement when the contact studs to which the movable suspension members are attached are in approximately their lowest position, so that the electrode will be supported to permit the movable suspension members to be disconnected from the contact studs in one row and permit such movable suspension members to be connected to the contact studs in a higher row, and means whereby such suspension members holding the electrode against movement may be released when the movable suspension members are again connected to contact studs to support said electrode.

8. A suspension mechanism for self-baking electrodes of the type described, comprising a plurality of contact studs driven into the sides of such an electrode and arranged in approximately horizontal rows, two pairs of support members, a plurality of suspension members, at least four of which are adapted to connect contact studs to one pair of said support members and at least another four of which are adapted to connect contact studs to the other pair of said support members and means for moving at least one of said support members whereby the weight of the electrode may alternately be carried by said two pairs of support members.

GEORG HAGERUP-LARSSEN.